US011396363B2

(12) United States Patent
van der Linden (10) Patent No.: US 11,396,363 B2
(45) Date of Patent: Jul. 26, 2022

(54) OPEN AND CLOSED CONTROL OF ACTUATORS, WHICH DRIVE AERODYNAMIC CONTROL SURFACES OF AN AIRCRAFT

(71) Applicant: Deutsches Zentrum für Luft- und Raumfahrt e.V., Cologne (DE)

(72) Inventor: Franciscus van der Linden, Munich (DE)

(73) Assignee: Deutsche Zentrum für Luft- und Raumfahrt e.V., Cologne (DE)

( * ) Notice: Subject to any disclaimer, the term of this patent is extended or adjusted under 35 U.S.C. 154(b) by 884 days.

(21) Appl. No.: 16/308,270

(22) PCT Filed: Sep. 15, 2017

(86) PCT No.: PCT/EP2017/073365
§ 371 (c)(1),
(2) Date: Dec. 7, 2018

(87) PCT Pub. No.: WO2018/050868
PCT Pub. Date: Mar. 22, 2018

(65) Prior Publication Data
US 2019/0144101 A1 May 16, 2019

(30) Foreign Application Priority Data

Sep. 19, 2016 (DE) ...................... 10 2016 117 634.6

(51) Int. Cl.
*B64C 13/50* (2006.01)
*G05D 1/08* (2006.01)
(52) U.S. Cl.
CPC ............ *B64C 13/503* (2013.01); *B64C 13/50* (2013.01); *G05D 1/0808* (2013.01)

(58) Field of Classification Search
CPC ......... B64C 13/16; B64C 13/18; B64C 13/50; G05D 1/046; G05D 1/0615; G05D 1/0204; G05D 1/08; G05D 1/0808
See application file for complete search history.

(56) References Cited

U.S. PATENT DOCUMENTS 3,044,734 A * 7/1962 Heppe ................. G05D 1/0808
340/963
3,184,188 A * 5/1965 Rossire ............... G01M 5/0041
250/221

(Continued)

FOREIGN PATENT DOCUMENTS

CN 101939220 A 1/2011
CN 103473967 A 12/2013

(Continued)

OTHER PUBLICATIONS

English Translation of the International Preliminary Report on Patentability issued in International Application No. PCT/EP2017/073365 dated Mar. 28, 2019.

*Primary Examiner* — Richard R. Green
*Assistant Examiner* — Steven J Shur
(74) *Attorney, Agent, or Firm* — Hoffmann & Baron, LLP (57) ABSTRACT

The invention relates to a device and to a method for the open and closed control of n actuators $A_n$, n=1, 2, . . . , N, where N≥1, which drive aerodynamic control surfaces of an aircraft. The proposed device includes a first interface at which, by manually inputting of a pilot into an input means, predefinitions $SV_{Pilot}$ for controlling the actuators $A_n$ are generated and made available and/or a second interface at which, by means of an automatic flight controller of the aircraft, predefinitions $SV_{AutoPilot}$ for controlling the actuators $A_n$ are generated and made available, a unit, which on the basis of predefinitions $SV_{Pilot}$ and/or $SV_{AutoPilot}$ per actuator $A_n$, determines a reference variable $F_{An,setpoint}$, for (Continued)

controlling the actuator $A_n$, wherein the reference variable $F_{An,setpoint}$ specifies a setpoint force or a setpoint torque, and per actuator $A_n$ a force/torque controller $REG_n$ for performing closed control of the actuator $A_n$ on the basis of the assigned reference variable $F_{An,setpoint}$ and a force/torque $F_{An}$ generated by the actuator $A_n$ as a closed-control variable which is determined by a sensor device $S1_n$, which is respectively present at or in the actuator $A_n$ or in the drivetrain of the respective actuator $A_n$.

13 Claims, 2 Drawing Sheets

(56) References Cited

U.S. PATENT DOCUMENTS

| | | | | |
|---|---|---|---|---|
| 3,528,633 | A * | 9/1970 | Knemeyer | B64C 13/18 |
| | | | | 244/179 |
| 4,725,020 | A * | 2/1988 | Whitener | B64C 13/16 |
| | | | | 244/76 R |
| 5,150,864 | A * | 9/1992 | Roglin | B64C 3/44 |
| | | | | 60/527 |
| 5,593,109 | A * | 1/1997 | Williams | F42B 10/64 |
| | | | | 244/3.28 |
| 6,189,836 | B1 * | 2/2001 | Gold | G05D 1/0816 |
| | | | | 701/4 |
| 7,424,989 | B2 | 9/2008 | Pitt | |
| 8,275,496 | B2 | 9/2012 | Rupnik et al. | |
| 8,489,257 | B2 * | 7/2013 | Holzhausen | B64C 13/16 |
| | | | | 701/4 |
| 10,401,875 | B2 * | 9/2019 | Matsui | G05D 3/20 |
| 2011/0108671 | A1 | 5/2011 | Soronda | |
| 2011/0118906 | A1 | 5/2011 | Fervel et al. | |
| 2014/0163783 | A1 * | 6/2014 | Pierre | B64C 13/18 |
| | | | | 701/11 |
| 2016/0096616 | A1 * | 4/2016 | Li | B64C 13/16 |
| | | | | 701/3 |
| 2017/0057620 | A1 | 3/2017 | Kossentini et al. | |

FOREIGN PATENT DOCUMENTS

| | | |
|---|---|---|
| CN | 105035309 A | 11/2015 |
| DE | 102011115356 A1 | 4/2013 |
| DE | 102011115359 A1 | 4/2013 |
| EP | 2772816 A1 | 9/2014 |
| WO | WO 2007/084679 A2 | 7/2007 |

* cited by examiner

OPEN AND CLOSED CONTROL OF ACTUATORS, WHICH DRIVE AERODYNAMIC CONTROL SURFACES OF AN AIRCRAFT

CROSS-REFERENCE TO RELATED APPLICATIONS

This application is the U.S. National Phase of International Patent Application No. PCT/EP2017/073365, filed on 15 Sep. 2017, which claims benefit of German Patent Application No. 10 2016 117 634.6, filed on 19 Sep. 2016, the contents of which are incorporated herein by reference in their entirety.

BACKGROUND

Field

The invention relates to a device and to a method for open and closed control of actuators, which drive aerodynamic control surfaces of an aircraft. The invention also relates to an aircraft with such type of device.

Related Art

Actuators, which drive the aerodynamic control surfaces (for example, ailerons, rudders, elevators, spoilers, brakes, air brakes, front wings, etc.) of an aircraft, are position-controlled in the prior art. Thus, actuators are typically specified as position or angle reference variables, and sometimes the time derivatives thereof, and controlled by a corresponding controller based on currently determined respective control variables.

The position control in this case is typically implemented in a rigid manner, which leads to high loads on the control surfaces and thus on the actuators in case of additional gust impact on the control surfaces. To prevent instabilities, the position-controlled actuators are typically conservatively designed due to the friction in the actuators. Nonlinear actuators or highly nonlinear actuators are not optimally suitable for position control.

DE 10 2011 115 359 A1 discloses an electronic device for positioning an actuator, wherein the electronic device can be directly or indirectly attached to the actuator and/or at least partially integrated into the actuator, wherein the electronic device is suitable for receiving commands from a flight control computer for controlling and/or switching-off the actuator.

DE 10 2011 115 356 A1 discloses a flight control system for the electronic actuation of actuating drives of the flight controller of an aircraft, wherein signal transmissions between flight control devices take place via a databus such that a distributed, bus-oriented electronic flight control system can be realized.

EP 2 772 816 A1 discloses a method for monitoring an aircraft. The method includes detection of an input signal of a pilot-input interface, determination of a response of an open and closed control system of the aerodynamic control surfaces of the aircraft based on a model and on the inputs by the pilot, as well as the generation of a warning when the open and closed control system reaches a limit.

WO 2007/084679 A2 discloses a backup control for a distributed open and closed flight control system of an aircraft.

U.S. Pat. No. 8,275,496 B2 discloses a method for reducing the vertical position errors of an aircraft. In doing so, a vertical fault acting on the aircraft is determined, and it is checked whether the fault exceeds predetermined threshold values. If a threshold value is exceeded, an uplift signal is determined and thus a control surface position is ordered.

U.S. Pat. No. 7,424,989 B2 discloses a method for vibration damping of a wing, in which the actuator of a wing control surface is actuated with a control signal with phase opposition to the vibration.

SUMMARY

The object of the invention is to provide a device and a method for more effective and quicker open and closed control of actuators driving the aerodynamic control surfaces of an aircraft.

The invention results from the features of the main claims Advantageous further developments and designs are the subject matter of the dependent claims. Further features, application options, and advantages of the invention result from the following description, and from the explanation of example embodiments of the invention represented in the figures.

A first aspect of the invention relates to a device for performing open and closed control of a number n actuators $A_n$, n=1, 2, ..., N, where N≥1, which drive the aerodynamic control surfaces of an aircraft.

The term "aircraft" here includes all flight devices that are heavier and also lighter than air, in particular, fixed-wing airplanes, helicopters, airships, multicopters, and drones. The aircraft may be designed for control by a person and/or have an automatic flight control device that allows for automatic/autonomous operation of the aircraft.

The "actuators" may be the following: hydraulic actuators, electromechanically driven actuators (for example, including an electric motor with and without gears). The actuators are typically connected to the assigned control surfaces by a mechanical system (drivetrain) such that these can be moved by the actuators. For reasons of redundancy, advantageously, at least two actuators drive one control surface.

The term "control surfaces" here includes all control surfaces that can be actuated and adjusted by actuators, by which a precise movement of the aircraft can be induced in flight, in particular, ailerons, rudders, elevators, spoilers, rotor blades, propeller blades, air brakes, slats, etceteras.

According to the invention, the proposed device includes a first interface at which, by manually inputting of a pilot into an input means, predefinitions $SV_{Pilot}$ for controlling the actuators $A_n$ are generated and made available, and/or a second interface at which, by an automatic flight controller of the aircraft, predefinitions $SV_{AutoPilot}$ for controlling the actuators $A_n$ are generated and made available.

Advantageously, the input means includes rudder pedals for specifying a setting of an aircraft rudder, as well as a means for inputting predefined aileron and/or elevator settings. The latter means can specifically be designed as a side-stick, a yoke, or a control stick.

The automatic flight controller is advantageously an autopilot system designed and configured for autonomous flight control. Advantageously, the respective predefinitions $SV_{Pilot}$ and $SV_{AutoPilot}$ are vectors whose vector elements make predefinitions (control information) available for an individual actuator $A_n$ and/or a group of actuators $A_n$. Manned aircraft advantageously have the first interface and the second interface. Unmanned aircraft (drones) advantageously have only the second interface.

According to the invention, the proposed device further includes a unit, which on the basis of the predefinitions $SV_{Pilot}$ and/or $SV_{AutoPilot}$ provided by the previously mentioned interfaces, determines per actuator $A_n$ a reference variable $F_{An,setpoint}$ for controlling the actuator $A_n$, wherein the reference variable $F_{An,setpoint}$ specifies a setpoint force or a setpoint torque, and per actuator $A_n$ a force/torque controller $REG_n$ for performing closed control of the actuator $A_n$ on the basis of the assigned reference variable $F_{An,setpoint}$ and/or $F_{An,setpoint}$ and a force/torque $F_{An}$ and/or the time derivative $\dot{F}_{An}$ thereof generated by the actuator $A_n$ as a closed-control variable which is determined by a sensor device $S1_n$, which is respectively present at or in the actuator $A_n$ or in the drivetrain of the respective actuator $A_n$.

The control strategy of such actuators here is thus converted to a force/torque-controlled approach, contrary to the position control used in the prior art. This has, in particular, the following advantages. Due to the force control, the control surfaces respond "flexibly" and/or "elastically" to gust loads acting externally on the control surface. When external gusts occur, the loads acting on the actuators, the control surfaces, and the structure of the aircraft are reduced. The force control allows for faster control, because the actuator dynamics can be better utilized. This is of particular interest concerning the impact of external gusts as well as fast flight maneuvers. Of course, not all actuators of an aircraft that drive control surfaces have to be controlled according to the proposed force/torque-based control concept, which means that one or more control surfaces of the aircraft may also be driven by position-controlled actuators.

The so-called "force fight" problem is bypassed by the proposed control strategy (force/torque-based control) as well. Such a "force fight" occurs with control surfaces driven by two or more position-controlled actuators when control variable deviations for the current position emerge for the respective actuators that are different for different actuators.

An advantageous further development of the proposed device is characterized in that the force/torque controllers $REG_n$ each have a processor $PR_n$ working with a processor clock rate $PT_n$, and in the unit has a processor $PR_E$ working with a processor clock rate $PT_E$, in which $PT_n > PT_E$, specifically $PT_n > 2\ PT_E$. In particular, with gusts externally impacting the control surfaces, this allows for a respectively fast and thus effective control of the respective actuators.

An advantageous further development of the proposed device is characterized in that a sensor device $S2_n$ is available per actuator $A_n$, determining a current position $POS_{An}$ of the actuator $A_n$ or a current position of the control surface assigned to the actuator $A_n$ and provides it to the force/torque controller $REG_n$. The term "current position $POS_{An}$" here includes, in particular, longitudinal positions and angular positions. The sensor device $S2_n$ advantageously has a position or angular sensor, by which a current position or a current angle is measured. Alternatively or in addition, the sensor device $S2_n$ may have a means for estimating the current position or the current angle that determines/estimates the position and/or the angle on the basis of other measurement variables, for example an electric current or an electric voltage. The current position $POS_{An}$ can be determined for the respective actuator, for the assigned drivetrain, or for the assigned control surface.

An advantageous further development of the proposed device is characterized in that the force/torque controllers $REG_n$ control the actuators $A_n$ such that the positions $POS_{An}$ are limited to an interval $I1_{An} := [Min(POS_{An}), Max(POS_{An})]$ defined by predetermined interval limits $Min(POS_{An})$, $Max(POS_{An})$, wherein $Min(POS_{An}) \leq POS_{An} \leq Max(POS_{An})$, wherein the specified intervals $I1_{an}$ each lie within an interval $I2_{An}$ $[Min_{mech}(POS_{An}), Max_{mech}(POS_{An})]$, of which the interval end values $Min_{mech}(POS_{An})$, $Max_{mech}(POS_{An})$ indicate respective positions at which a movement of the respective actuator $A_n$ or the respectively assigned control surface is mechanically limited. This further development is based on the presence of the previously described sensor devices $S2_n$. As a result, "virtual end stops and/or limits" are defined by this control for a movement of the respective actuator and thus of the assigned control surface. Advantageously, the interval length of interval $I1_{An}$ is smaller than the interval length of interval $I2_{An}$. Further advantageously, the interval $I1_{An}$ is in interval $I2_{An}$ such that the interval limits of interval $I1_{An}$ are spaced apart from the interval limits of $I2_{An}$. This limits the travel ranges of the actuators and/or the control surfaces, while simultaneously preventing the actuators and/or the control surfaces from moving to mechanical limits, which increases the service life correspondingly.

In order to implement the specified control, a function $F(Pos_{An})$ is advantageously defined by interval $I1_{An}$, the amount $|F(Pos_{An})|$ of the function not being negligible only in the range of interval limits $Min(POS_{An})$, $Max(POS_{An})$, and the function $F(POS_{An})$ being selected such that $|F(Min(POS_{An}))| = |F_{An,setpoint}|$ and $|F(Max(POS_{An}))| = |F_{An,setpoint}|$, and wherein a control variable $F^*_{An}$ is fed back to the force/torque controllers $REG_n$, for which $F^*_{An} = F_{An} - F(POS_{An})$.

Advantageously, the interval limits $Min(POS_{An})$, $Max(POS_{An})$ are selected by the respective force/torque controller $REG_n$ (106) as a function of an available current dynamic condition, and/or as a function of a current configuration of the aircraft, and/or of parameters describing the ambient air. The dynamic condition includes, for example, the following condition variables: airspeed, flying altitude, load factors, attitude, yaw angle, pitch angle, and the changes thereof over time, etceteras. The current configuration of the aircraft describes, for example, whether the landing gear is extended or retracted, which flaps are set and how, etceteras. The air parameters indicate, for example, the air temperature, the air pressure, the air humidity, and the air density. The changeably predetermined interval limits and thus the changeably predetermined virtual limits, for example, of rudder deflections or extendable flaps, contribute to flight safety, because they optimize/limit the actuation of aerodynamic control surfaces to the dynamic condition, the configuration, and the parameters describing the ambient air.

An even further development of the proposed device is characterized in that a position controller is made available for actuating the actuators $A_n$, wherein there is a switchover from the force/torque controller to the position controller when the interval limits $Min(POS_{An})$, $Max(POS_{An})$ are reached.

An advantageous further development of the proposed device is characterized in that a control variable $F^{}_{An}$ is fed back to the force/torque controller $REG_n$, such that for $F^{}_{An}$, $F^{**}_{An} = F^*_{An} + F_G$, wherein $F_G$ is a constant trim force for gravitational compensation for gravitational forces acting on the respective control surface, and/or the drivetrain of the respective actuator $A_n$, or wherein $F_G$ is an auto-trim function that is dependent on the $POS_{An}$, and/or on the time t. Advantageously, for $F_G$, $d(F_G)/dt = k^*F_{An,setpoint}$, wherein k is a predetermined constant. Thus, the function $F_G$ is either a constant for trimming and/or for compensating a gravitational force acting on the respective control surface or an integration element with low amplification. These further developments allow for the compensation of external forces acting on the actuator and the storage and/or retention of the current actuator positions $POS_{An}$, such that a trimmed aircraft will continue to fly in case of a control signals (reference variables) failure.

An advantageous further development of the proposed device is characterized in that a control variable $F^{*}_{An}$ is fed back to the force/torque controller $REG_n$, for which $F^{*}_{An}=F^{*}_{An}+F_D$ or $F^{***}_{An}=F^{*}_{An}+F_G+F_D$, wherein for $F_D$, $F_D=d(POS_{An})/dt^{*}D$, wherein D indicates virtual damping.

An advantageous further development of the proposed device is characterized in that a control variable $F^{**}_{An}$ is fed back to the force/torque controller $REG_n$, for which $F^{**}_{An}=F^{*}_{An}+F_S$ or $F^{****}_{An}=F^{*}_{An}+F_G+F_S$ or $F^{****}_{An}=F^{*}_{An}+F_D+F_S$ or $F^{****}_{An}=F^{*}_{An}+F_D$ $F_G+F_S$, wherein for $F_S$, $F_S=(POS_{An}-POS_{ref})^{*}S$, wherein S represents a virtual rigidity and $POS_{ref}$ indicates a neutral position of the respective control surface, wherein the neutral position $POS_{ref}$ is characterized in that no torque inducing an aircraft movement is generated by the respective control surface.

The previous three further developments allow for the compensation of external forces acting on the actuator and the storage and/or retention of the current actuator positions $POS_{An}$ such that a trimmed aircraft will continue to fly even in case of a control signals (reference variables) failure.

An advantageous further development of the proposed device is characterized in that actuators $A_n$ have electric motors as drive units. Advantageously, the corresponding sensor devices $S1_n$ have current sensors for measuring the respective operating current of the electric motors. This allows for a simple determination and/or estimation of the current actuator torque, because the motor torque is directly related to the motor current. Static friction, which might potentially corrupt this estimation, can be interrupted at high frequency, for example by a knocker-pulse method, which leads to a significant improvement in torque estimation on the basis of measurements of the motor current.

An advantageous further development of the proposed device is characterized in that at the first interface for a plurality of actuators $A_n$ whose assigned control surfaces induce torques about the same aircraft axis (longitudinal axis, transverse axis, vertical axis), a control variable $<F^{*}_{An}>$ weighted for actuators $A_n$ and/or a weighted position $<POS_{An}>$ are made available in order to allow for a total force feedback for the respective aircraft axis at the input means (110). For example, if a pilot pulls the control stick in the cockpit, this triggers a movement of the aircraft around the transverse axis. The elevator is moved in order to execute this movement. Typically, the elevator is actuated by two or more actuators. According to this further development, for example, the control variables $<F^{*}_{An}>$ of these actuators are weighted for the total force feedback. Furthermore, in addition to the elevator, other control surfaces on the aircraft can also be actuated in order to execute such a movement around the transverse axis. According to this further development, the control variables $<F^{*}_{An}>$, for example, of these actuators are also included in the previous weighting.

A further development of the proposed device is characterized in that one or more force/torque controllers $REG_n$ have a reference-variable feed-forward control, which compensates friction and/or dynamics in the actuator $A_n$ and/or friction and/or dynamics in the respective drivetrain assigned to actuator $A_n$, including the assigned control surface, on the basis of $F_{An,setpoint}$, $F_{An}$ or $F^{*}_{An}$, and $POS_{An}$. In particular, large aerodynamic forces act on control surfaces deflected against the air current, which transfer to the actuator by the drivetrain. The reference-variable feed-forward control in particular allows for an improvement in actuator dynamics.

A second aspect of the present invention relates to an aircraft with a device as described above. Advantageously, the force/torque controllers $REG_n$ in the aircraft are disposed at the respectively assigned actuators $A_n$ or in immediate proximity of the respective actuator $A_n$. This allows for short signal propagation delays between the sensors and the controllers, and thus for a reduction of actuator response times. Advantageously, the input means in the aircraft has rudder pedals and a side-stick, or a control stick, or a yoke.

Advantageous further developments of the aircraft result from an analogous and corresponding transfer of the above explanations regarding the device according to the invention.

A third aspect of the present invention relates to a method for the open and closed control of n actuators $A_n$, n=1, 2, ..., N, which drive the aerodynamic control surfaces of an aircraft. The proposed method includes the following steps: In a first step, a predefinition $SV_{Pilot}$, generated by a manual input of a pilot into an input means, is made available to control the actuators $A_n$. Alternatively or in addition, a predefinition $SV_{AutoPilot}$, generated by an automatic flight controller of an aircraft, is made available to control the actuators $A_n$. In a second step, a reference variable $F_{An,setpoint}$ to control the actuator $A_n$ is determined on the basis of the predefinitions $SV_{Pilot}$ and/or $SV_{AutoPilot}$ per actuator $A_n$, wherein the reference variable $F_{An,setpoint}$ specifies a setpoint force or a setpoint torque. Per actuator $A_n$ there is then a controlling, by a force/torque controller $REG_n$, of the actuator $A_n$ on the basis of the assigned reference variable $F_{An,setpoint}$ and a force/torque $F_{An}$, or optionally $\dot{F}_{An}$ as the control variable determined by a sensor device $S1_n$, respectively present on or in the actuator $A_n$ or in the drivetrain of the respective actuator $A_n$.

An advantageous further development of the proposed method is characterized in that the force/torque controllers $REG_n$ respectively have a processor $PR_n$ working with a processor clock rate $PT_n$, and the unit has a processor $PR_E$ working with a processor clock rate $PT_E$, wherein the following applies: $PT_n > PT_E$, particularly $PT_n > 2^{*}PT_E$.

An advantageous further development of the proposed method is characterized in that, for each actuator $A_n$, a sensor device $S2_n$ is present, which acquires a current position $POS_{An}$ of the actuator $A_n$ or a current position of the control surface assigned to the actuator $A_n$ and provides it to the force/torque controller $REG_n$.

An advantageous further development of the proposed method is characterized in that the force/torque controllers $REG_n$ control the actuators $A_n$ such that the positions $POS_{An}$ are limited to an interval $I1_{An}:=[Min(POS_{An}), Max(POS_{An})]$ defined by specified interval limits $Min(POS_{An})$, $Max(POS_{An})$, where: $Min(POS_{An}) \leq POS_{An} \leq Max(POS_{An})$, wherein the specified intervals $I1_{An}$ each lie within an interval $I2_{An}[Min_{mech}(POS_{An}), Max_{mech}(POS_{An})]$, the interval end values $Min_{mech}(POS_{An})$, $Max_{mech}(POS_{An})$ of which indicate respective positions, at which a movement of the respective actuator $A_n$ or the respectively assigned control surface is limited mechanically.

An advantageous further development of the proposed method is characterized in that the interval length of interval $I1_{An}$ is less than the interval length of interval $I2_{An}$. Advantageously, interval $I1_{An}$ lies in the middle in interval $I2_{An}$.

An advantageous further development of the proposed method is characterized in that a function $F(Pos_{An})$ is defined by interval $I1_{An}$, with the amount $|F(Pos_{An})|$ of the function not being negligible only in the range of interval limits $Min(POS_{An})$, $Max(POS_{An})$, wherein the function $F(POS_{An})$ is selected such that the following applies: $|F(Min(POS_{An}))|=|F_{An,setpoint}|$ and $|F(Max(POS_{An})=|F_{An,setpoint}|$, and wherein a control variable $F^*_{An}$ is fed back to the force/torque controller $REG_n$, to which the following applies: $F^*_{An}=F_{An}-F(POS_{An})$.

An advantageous further development of the proposed method is characterized in that the interval limits $Min(POS_{An})$, $Max(POS_{An})$ are selected by the respective force/torque controller $REG_n$ as a function of a made available current dynamic condition and/or as a function of a current configuration of the aircraft.

An advantageous further development of the proposed method is characterized in that a control variable $F^{}_{An}$ is fed back to the force/torque controller $REG_n$, with which the following applies to $F^{}_{An}$: $F^{**}_{An}=F^*_{An}+F_G$, wherein $F_G$ is a constant trim force for gravitational compensation for gravitational forces acting on the respective control surface and/or the drivetrain of the respective actuator $A_n$, or wherein $F_G$ is an auto-trim function, which is dependent on the $POS_{An}$ and/or on time t. Advantageously, $d(F_G)/dt=k^*F_{An,setpoint}$ applies to $F_G$, wherein k is a given constant.

An advantageous further development of the proposed method is characterized in that a control variable $F^{*}_{An}$ is fed back to the force/torque controller $REG_n$, with which the following applies: $F^{*}_{An}=F^*_{An}+F_D$ or $F^{***}_{An}=F^*_{An}+F_G$ $F_D$, wherein the following applies to $F_D$: $F_D=d(POS_{An})/dt^*D$, wherein D indicates virtual damping.

An advantageous further development of the proposed method is characterized in that a control variable $F^{**}_{An}$ is fed back to the force/torque controller $REG_n$, to which the following applies: $F^{**}_{An}=F^*_{An}+F_S$ or $F^{****}_{An}=F^*_{An}+F_G+F_S$ or $F^{****}_{An}=F^*_{An}+F_D+F_S$ or $F^{****}_{An}=F^*_{An}+F_D+F_G+F_S$, wherein the following applies to $F_S$: $F_S=(POS_{An}-POS_{ref})^*S$, wherein S represents a virtual rigidity and $POS_{ref}$ indicates a neutral position of the respective control surface, wherein the neutral position $POS_{ref}$ is characterized in that no torque inducing an aircraft movement is generated by the respective control surface.

An advantageous further development of the proposed method is characterized in that, at the first interface for a plurality of actuators $A_n$, the assigned control surfaces thereof induce torques about the same aircraft axis (longitudinal axis, transverse axis, vertical axis); a control variable $<F^*_{An}>$ weighted for actuators $A_n$ and/or a weighted position $<POS_{An}>$ are made available to allow for a total force feedback for the respective aircraft axis at the input means.

An advantageous further development of the proposed method is characterized in that one or more force/torque controllers $REG_n$ have a reference-variable feed-forward control, which compensates friction and/or dynamics in the actuator $A_n$ and/or friction and/or dynamics in the respective drivetrain assigned to actuator $A_n$, including the assigned control surface, on the basis of $F_{An,setpoint}$, $F_{An}$ or $F^*_{An}$, and $POS_{An}$.

Further advantages of the proposed method result from an analogous and corresponding transfer of the statements made regarding the device according to the invention.

A further aspect of the present invention relates to a computer system with a data processing device, wherein the data processing device is designed such that a previously described method is executed on the data processing device.

A further aspect of the invention relates to a digital memory medium with electronically readable control signals, wherein the control signals can cooperate with a programmable computer system such that a previously described method is executed.

A further aspect of the invention relates to a computer program product with a memory code, stored on a machine-readable carrier, for executing the previously described method when the program code is implemented on a data processing device.

A further aspect of the invention relates to a computer program with memory codes for executing the previously described method when the program is running on a data processing device. To this end, the data processing device may be designed as any computer system known from the prior art.

Other advantages, features, and details result from the following description, in which at least one example embodiment is described in detail optionally with reference to the drawing. Equivalent, similar, and/or functionally equivalent parts have been given the same reference numbers.

DETAILED DESCRIPTION

Figure 1:
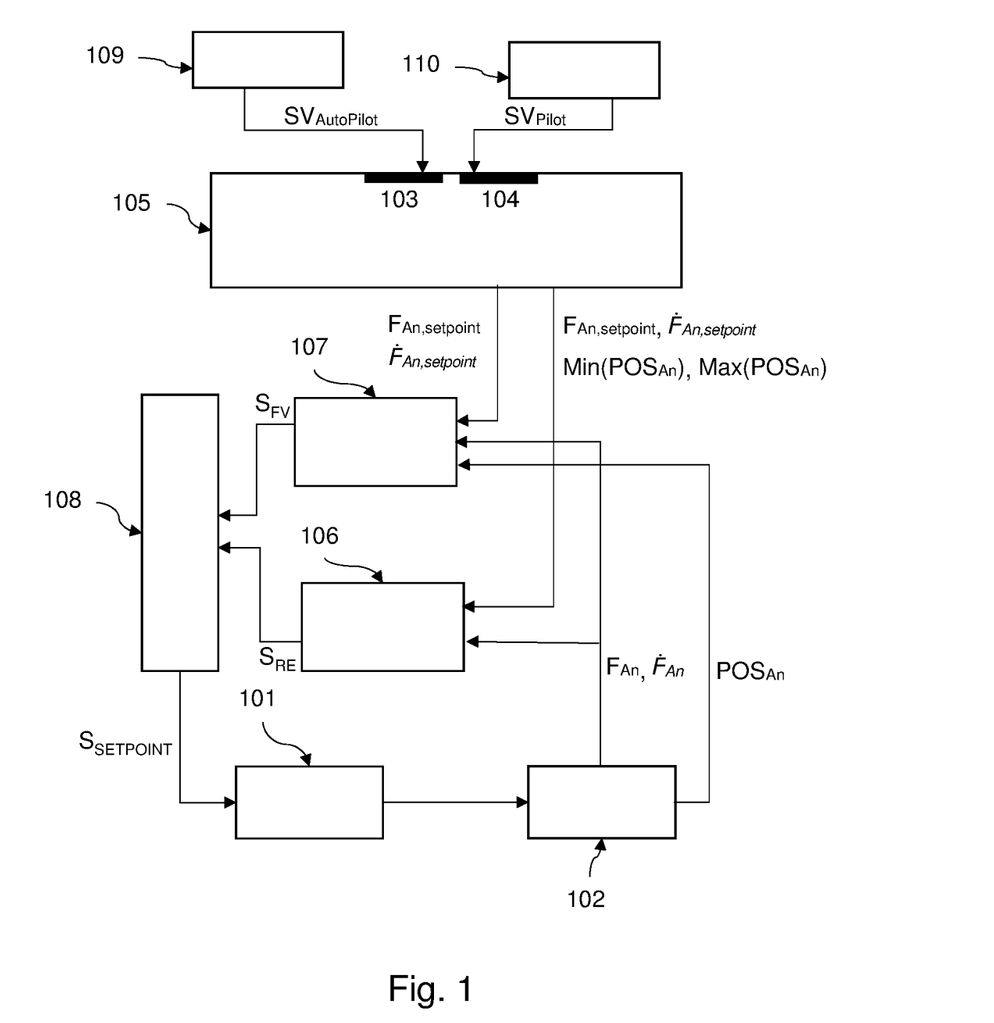
FIG. 1 shows a diagram representation of the configuration of the device according to the invention.

FIG. 1 shows a diagram representation of the configuration of the device according to the invention for the open and closed control of one of n actuators $A_n$ 101, n=1, 2, ..., N, where N≥1, which drive the aerodynamic control surfaces (102) of an aircraft.

The device includes a first interface 104, on which predefinitions $SV_{Pilot}$ for controlling the actuators $A_n$ (known as elevator, aileron, rudder) are generated and made available through the manual input of a pilot into an input means 110, here including rudder pedals as well as a yoke. Furthermore, the device includes a second interface 103, on which predefinitions $SV_{AutoPilot}$ for controlling the actuators $A_n$ 101 are generated and made available by an automatic flight controller 109 (here an autopilot of the aircraft). For simplification, only one of the n actuators $A_n$ 101 is shown in the diagram in FIG. 1.

The first interface 104 and the second interface 103 are components of the unit 105. To this end, the unit 105 is designed and configured on the basis of the predefinitions $SV_{Pilot}$ and/or $SV_{AutoPilot}$, per actuator $A_n$ 101, to determine a reference variable $F_{An,setpoint}$ for controlling the actuator $A_n$ 101, wherein the reference variable $F_{An,setpoint}$ specifies a setpoint torque.

The device further includes, per actuator $A_n$ 101, a torque controller $REG_n$ 106 for controlling the actuator $A_n$ 101 on the basis of the assigned reference variable $F_{An,setpoint}$ as well as the time derivative $\dot{F}_{An,setpoint}$ thereof and a torque $F_{An}$ generated by the actuator $A_n$ 101, as well as the time derivative $\dot{F}_{An}$ thereof as a control variable, which is determined by a sensor device $S1_n$ (not shown), which is present on or in the actuator $A_n$ or in the drivetrain of the respective actuator $A_n$.

The device shown further includes a reference-variable feed-forward control 107, which compensates, based on $F_{An,setpoint}$, $\dot{F}_{An,setpoint}$, $F_{An}$, and $\dot{F}_{An}$, friction in the actuator $A_n$ 101 and friction in the respective drivetrain assigned to the actuator $A_n$ 101, as well as an aerodynamic force to be expected on the control surface 102 due to the deflection of the control surface according to $F_{An,setpoint}$ The outputs of the reference-variable feed-forward control 107 and of the torque controller $REG_n$ 106 are combined in a totalizer 108 and supplied to the actuator 101 as a control variable. As a result, the actuator effects a movement of the control surface 102. The reference-variable feed-forward control 107 generates the manipulated variable $S_{FV}$ as an output signal. The torque controller $REG_n$ 106 generates the manipulated variable $S_{RE}$ as an output signal. The totalizer 108 determines the manipulated variable $S_{SETPOINT}=S_{FV}+S_{RE}$ from the two input manipulated variables.

Figure 2:
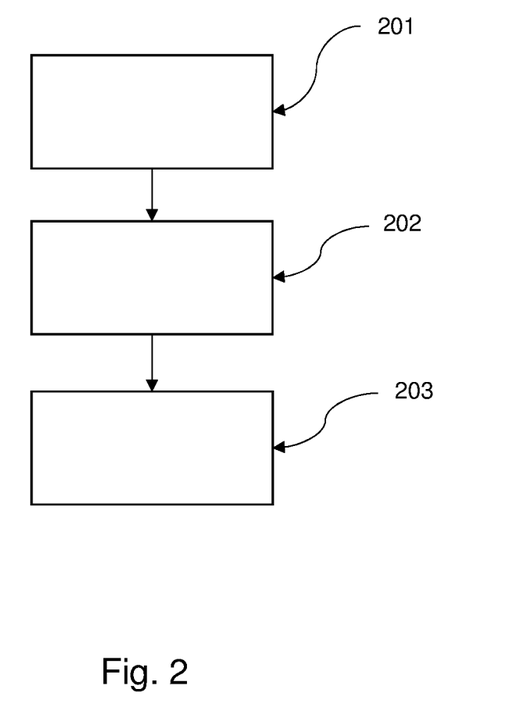
FIG. 2 shows a schematic flowchart of the method according to the invention.

FIG. 2 shows a flowchart of a method according to the invention for the open and closed control of n actuators $A_n$ 101, n=1, 2, ..., N, where N≥1, which drive the aerodynamic control surfaces 102 of an aircraft. The method includes the following steps: In a first step 201, a predefinition $SV_{Pilot}$, generated by a manual input of a pilot into an input means, is made available to control the actuators $A_n$ and/or predefinition $SV_{AutoPilot}$, generated by an automatic flight controller of the aircraft, is made available to control the actuators $A_n$. In a second step 202, a reference variable $F_{An,setpoint}$ as well as the time derivative $\dot{F}_{An,setpoint}$ thereof for controlling the actuator $A_n$ 101 is determined 202 on the basis of predefinitions $SV_{Pilot}$ and/or $SV_{AutoPilot}$, per actuator $A_n$ 101, wherein the reference variable $F_{An,setpoint}$ specifies a setpoint force or a setpoint torque.

In a third step 203, there is a controlling of the actuator $A_n$ 101 by means of a force/torque controller $REG_n$ 106, for each actuator $A_n$ 101, on the basis of the assigned reference variables $F_{An,setpoint}$, $\dot{F}_{An,setpoint}$ and a force/torque $F_{An}$ generated by the actuator $A_n$ as a reference variable, which is determined by a sensor device $S1_n$, which is present on or in the actuator $A_n$ or in the drivetrain of the respective actuator $A_n$.

Although the invention has been illustrated and explained in more detail by using preferred example embodiments, the invention is not limited by the disclosed examples and other variations may be derived by one of ordinary skill in the art without extending beyond the protective scope of the invention. It is thus clear that a plurality of variation options exists. It is likewise clear that example embodiments actually only represent examples, which are not to be interpreted in any manner as a limitation, for example, of the protective scope, the use options, or the configuration of the invention. Rather, the previous description and the description of figures should make one of ordinary skill in the art capable of specifically implementing the example embodiments, wherein one of ordinary skill in the art with knowledge of the disclosed concept of the invention can undertake various changes, for example with respect to the function or the arrangement of individual elements listed in an example embodiment, without going beyond the scope of protection, which is defined by the claims and the legal equivalents thereof such as, for example, more extensive explanations in the description.

LIST OF REFERENCE NUMBERS

101 Actuators, actuators $A_n$
102 Control surfaces
103 Second interface
104 First interface
105 Unit
106 Force/torque controller $REG_n$
107 Reference-variable feed-forward control
108 Totalizer
109 Automatic flight controller, autopilot
110 Input means
$SV_{AutoPilot}$ Autopilot control predefinition
$SV_{Pilot}$ Pilot control predefinition
$F_{An,setpoint}$ Reference variable
$S_{FV}$ Manipulated variable of the reference-variable feed-forward control
$S_{RE}$ Manipulated variable of the torque controller $REG_n$
$S_{SETPOINT}$ Manipulated variable as a total of $S_{FV}+S_{RE}$
$POS_{An}$ Position of the actuator $A_n$
$Min(POS_{An})$ Minimum of the position $POS_{An}$
$Max(POS_{An})$ Maximum of the position $POS_{An}$
201-203 Method steps

The invention claimed is:

1. A device for open and closed control of n actuators $A_n$, n=1, 2, ..., N, where N≥1, the actuators $A_n$ being configured to drive aerodynamic control surfaces of an aircraft, the device comprising:
  a first interface to generate and make available predefinitions $SV_{Pilot}$ for controlling the actuators $A_n$ by a manual input of a pilot into an input means, and/or a second interface to generate and make available predefinitions $SV_{AutoPilot}$ for controlling the actuators $A_n$ by an automatic flight controller of the aircraft;
  a unit to determine, for a respective actuator $A_n$, a reference variable $F_{An,setpoint}$ and/or a time derivative $\dot{F}_{An,setpoint}$ thereof for controlling the respective actuator $A_n$ based on the predefinitions $SV_{Pilot}$ and/or $SV_{AutoPilot}$, wherein the reference variable $F_{An,setpoint}$ specifies a setpoint force or a setpoint torque;
  a sensor device $S1_n$, for the respective actuator $A_n$, disposed on or in the respective actuator $A_n$ or in a drivetrain of the respective actuator $A_n$, the sensor device Sin to determine a force/torque $F_{An}$ generated by the respective actuator $A_n$;
  a sensor device $S2_n$, for the respective actuator $A_n$, to determine a current position $POS_{An}$ of the respective actuator $A_n$, the drivetrain of the respective actuator $A_n$, or an aerodynamic control surface assigned to the respective actuator $A_n$; and
  a force/torque controller $REG_n$, for the respective actuator $A_n$, to control the respective actuator $A_n$ based on the determined reference variable $F_{An,setpoint}$ and/or the determined time derivative $\dot{F}_{An,setpoint}$ and a force/torque variable $F^*_{An}$ received as feedback from a function $F(POS_{An})$, the function $F(POS_{An})$ based on the determined force/torque $F_{An}$ generated by the respective actuator $A_n$ and the determined current position $POS_{An}$ of the respective actuator $A_n$, such that the current position $POS_{An}$ is limited to an interval $I1_{An}:=[Min(POS_{An}), Max(POS_{An})]$ defined by interval limits $Min(POS_{An})$, $Max(POS_{An})$, where: $Min(POS_{An}) \leq POS_{An} \leq Max(POS_{An})$, wherein the interval $I1_{An}$ lies within an interval $I2_{An}:=[Min_{mech}(POS_{An}), Max_{mech}(POS_{An})]$ defined by interval end values $Min_{mech}(POS_{An})$, $Max_{mech}(POS_{An})$, wherein the interval end values $Min_{mech}(POS_{An})$, $Max_{mech}(POS_{An})$ indicate respective positions at which movement of the respective actuator $A_n$ or the aerodynamic control surface assigned to the respective actuator $A_n$ is limited mechanically, wherein the function $F(POS_{An})$ is defined by the interval $I1_{An}$, with an amount $|F(POS_{An})|$ of the function $F(POS_{An})$ not being negligible only in a range of the interval limits $Min(POS_{An})$, $Max(POS_{An})$, wherein the function $F(POS_{An})$ is selected such that the following applies: $|F(Min(POS_{An}))|=|F_{An,setpoint}|$ and $|F(Max(POS_{An}))|=|F_{An,setpoint}|$, wherein the control variable $F^*_{An}$ is fed back to the force/torque controller $REG_n$ to which the following applies: $F^*_{An}=F_{An}-F(POS_{An})$, and wherein the force/torque variable $F^*_{An}$ allows the controller $REG_n$ to control the respective actuator $A_n$ in the range of the interval limits $Min(POS_{An})$, $Max(POS_{An})$ so that the current position $POS_{An}$ of the respective actuator $A_n$ is maintained within the interval $I1_{An}$.

2. The device according to claim 1, wherein the force/torque controller $REG_n$ includes a processor $PR_n$ that functions with a processor clock rate $PT_n$, and the unit includes a processor $PR_E$ that functions with a processor clock rate $PT_E$, wherein the following applies: $PT_n > PT_E$.

3. The device according to claim 1, wherein the force/torque controller $REG_n$ includes a processor $PR_n$ that functions with a processor clock rate $PT_n$, and the unit includes a processor $PR_E$ that functions with a processor clock rate $PT_E$, wherein the following applies: $PT_n > 2*PT_E$.

4. The device according to claim 1, wherein a control variable $F^{}An$ is fed back to the force/torque controller REGn, in which the following applies: $F^{}An = F^*An + FG$, wherein FG is a constant trim force for gravitational compensation of gravitational forces acting on the aerodynamic control surface and/or the drivetrain of the respective actuator An or wherein FG is an auto-trim function that is dependent on the POSAn and/or on a time t.

5. The device according to claim 4, wherein a control variable $F^{*}_{An}$ is fed back to the force/torque controller $REG_n$, in which the following applies: $F^{*}_{An} = F^*_{An} + F_D$ or $F^{***}_{An} = F^*_{An} + F_G + F_D$, wherein the following applies: $F_D = d(POS_{An})/dt * D$, wherein D indicates a virtual damping.

6. The device according to claim 5, wherein a control variable $F^{**}_{An}$ is fed back to the force/torque controller $REG_n$, in which the following applies: $F^{**}_{An} = F^*_{An} + F_S$ or $F^{****}_{An} = F^*_{An} + F_G + F_S$ or $F^{****}_{An} = F^*_{An} + F_D + F_S$ or $F^{****}_{An} = F^*_{An} + F_D + F_G + F_S$, wherein the following applies: $F_S = (POS_{An} - POS_{ref}) * S$, wherein S represents a virtual rigidity and $POS_{ref}$ indicates a neutral position of the aerodynamic control surface, wherein the neutral position $POS_{ref}$ is characterized in that no torque inducing movement of the aircraft is generated by the aerodynamic control surface.

7. An aircraft comprising a device for open and closed control of n actuators $A_n$, n=1, 2, . . . , N, where N≥1, the actuators $A_n$ being configured to drive aerodynamic control surfaces of the aircraft, the device comprising:
a first interface to generate and make available predefinitions $SV_{Pilot}$ for controlling the actuators $A_n$ by a manual input of a pilot into an input means, and/or a second interface to generate and make available predefinitions $SV_{AutoPilot}$ for controlling the actuators $A_n$ by an automatic flight controller of the aircraft;
a unit to determine, for a respective actuator $A_n$, a reference variable $F_{An,setpoint}$ and/or a time derivative $\dot{F}_{An,setpoint}$ thereof for controlling the respective actuator $A_n$ based on the predefinitions $SV_{Pilot}$ and/or $SV_{AutoPilot}$, wherein the reference variable $F_{An,setpoint}$ specifies a setpoint force or a setpoint torque;
a sensor device $S1_n$, for the respective actuator $A_n$, disposed on or in the respective actuator $A_n$ or in a drivetrain of the respective actuator $A_n$, the sensor device $S1_n$ to determine a force/torque $F_{An}$ generated by the respective actuator $A_n$;
a sensor device $S2_n$, for the respective actuator $A_n$, to determine a current position $POS_{An}$ of the respective actuator $A_n$, the drivetrain of the respective actuator $A_n$, or an aerodynamic control surface assigned to the respective actuator $A_n$; and
a force/torque controller $REG_n$, for the respective actuator $A_n$, to control the respective actuator $A_n$ based on the determined reference variable $F_{An,setpoint}$ and/or the determined time derivative $\dot{F}_{An,setpoint}$, and a force/torque variable $F^*_{An}$ received as feedback from a function $F(POS_{An})$, the function $F(POS_{An})$ based on the determined force/torque $F_{An}$ generated by the respective actuator $A_n$ and the determined current position $POS_{An}$ of the respective actuator $A_n$, such that the current position $POS_{An}$ is limited to an interval $I1_{An} := [Min(POS_{An}), Max(POS_{An})]$ defined by interval limits $Min(POS_{An})$, $Max(POS_{An})$, where: $Min(POS_{An}) \leq POS \leq Max(POS_{An})$, wherein the interval $I1_{An}$ lies within an interval $I2_{An} := [Min_{mech}(POS_{An}), Max_{mech}(POS_{An})]$ defined by interval end values $Min_{mech}(POS_{An})$, $Max_{mech}(POS_{An})$, wherein the interval end values $Min_{mech}(POS_{An})$, $Max_{mech}(POS_{An})$ indicate respective positions at which movement of the respective actuator $A_n$ or the aerodynamic control surface assigned to the respective actuator $A_n$ is limited mechanically, wherein the function $F(POS_{An})$ is defined by the interval $I1_{An}$, with an amount $|F(POS_{An})|$ of the function $F(POS_{An})$ not being negligible only in a range of the interval limits $Min(POS_{An})$, $Max(POS_{An})$, wherein the function $F(POS_{An})$ is selected such that the following applies: $|F(Min(POS_{An}))| = |F_{An,setpoint}|$ and $|F(Max(POS_{An}))| = |F_{An,setpoint}|$, wherein the control variable $F^*_{An}$ is fed back to the force/torque controller $REG_n$ to which the following applies: $F^*_{An} = F_{An} - F(POS_{An})$, and wherein the force/torque variable $F^*_{An}$ allows the controller $REG_n$ to control the respective actuator $A_n$ in the range of the interval limits $Min(POS_{An})$, $Max(POS_{An})$ so that the current position $POS_{An}$ of the respective actuator $A_n$ is maintained within the interval $I1_{An}$.

8. A method for the open and closed control of n actuators $A_n$, n=1, 2, . . . , N, where N≥1, the actuators $A_n$ being configured to drive aerodynamic control surfaces of an aircraft, the method comprising:
provisioning a predefinition $SV_{Pilot}$, generated by a manual input of a pilot into an input means, to control the actuators $A_n$, and/or provisioning a predefinition $SV_{AutoPilot}$, generated by an automatic flight controller of the aircraft, to control the actuators $A_n$;
determining, for a respective actuator $A_n$, a reference variable $F_{An,setpoint}$ and/or a time derivative $\dot{F}_{An,setpoint}$ thereof for controlling the respective actuator $A_n$ based on the predefinitions $SV_{Pilot}$ and/or $SV_{AutoPilot}$, wherein the reference variable $F_{An,setpoint}$ specifies a setpoint force or a setpoint torque;
determining a force/torque $F_{An}$ generated by the respective actuator $A_n$, via a sensor device $S1_n$, for the respective actuator $A_n$, disposed on or in the respective actuator $A_n$ or in a drivetrain of the respective actuator $A_n$;
determining a current position $POS_{An}$ of the respective actuator $A_n$, the drivetrain of the respective actuator $A_n$, or an aerodynamic control surface assigned to the respective actuator $A_n$, via a sensor device $S2_n$, for the respective actuator $A_n$; and
controlling the respective actuator $A_n$ using a force/torque controller $REG_n$, based on the determined reference variable $F_{An,setpoint}$ and/or the determined time derivative $\dot{F}_{An,setpoint}$, and a force/torque variable $F^*_{An}$ received as feedback from a function $F(POS_{An})$, the function $F(POS_{An})$ based on the determined force/torque $F_{An}$ generated by the respective actuator $A_n$ and the determined current position $POS_{An}$ of the respective actuator $A_n$, such that the current position $POS_{An}$ is limited to an interval $I1_{An} := [Min(POS_{An}), Max(POS_{An})]$ defined by interval limits $Min(POS_{An})$, $Max(POS_{An})$, where: $Min(POS_{An}) \leq POS_{An} \leq Max(POS_{An})$, wherein the interval $I1_{An}$ lies within an interval $I2_{An} := [Min_{mech}(POS_{An}), Max_{mech}(POS_{An})]$ defined by interval end values $Min_{mech}(POS_{An})$, $Max_{mech}(POS_{An})$, wherein the interval end values $\text{Min}_{mech}(\text{POS}_{An})$, $\text{Max}_{mech}(\text{POS}_{An})$ indicate respective positions at which movement of the respective actuator $A_n$ or the aerodynamic control surface assigned to the respective actuator $A_n$ is limited mechanically, wherein the function $F(\text{POS}_{An})$ is defined by the interval $I1_{An}$, with an amount $|F(\text{POS}_{An})|$ of the function $F(\text{POS}_{An})$ not being negligible only in a range of the interval limits $\text{Min}(\text{POS}_{An})$, $\text{Max}(\text{POS}_{An})$, wherein the function $F(\text{POS}_{An})$ is selected such that the following applies: $|F(\text{Min}(\text{POS}_{An}))|=|F_{An,setpoint}|$ and $|F(\text{Max}(\text{POS}_{An}))|=|F_{An,setpoint}|$, wherein the control variable $F^*_{An}$ is fed back to the force/torque controller $\text{REG}_n$ to which the following applies: $F^*_{An}=F_{An}-F(\text{POS}_{An})$, and wherein the force/torque variable $F^*_{An}$ allows the controller $\text{REG}_n$ to control the respective actuator $A_n$ in the range of the interval limits $\text{Min}(\text{POS}_{An})$, $\text{Max}(\text{POS}_{An})$ so that the current position $\text{POS}_{An}$ of the respective actuator $A_n$ is maintained within the interval $I1_{An}$.

9. The method according to claim 8, wherein the method comprises:
providing the force/torque controller $\text{REG}_n$ with a processor $\text{PR}_n$ that functions with a processor clock rate $\text{PT}_n$; and
providing the unit with a processor $\text{PR}_E$ that functions with a processor clock rate $\text{PT}_E$, wherein the following applies: $\text{PT}_n > \text{PT}_E$.

10. The method according to claim 8, wherein the method comprises:
providing the force/torque controller $\text{REG}_n$ with a processor $\text{PR}_n$ that functions with a processor clock rate $\text{PT}_n$; and
providing the unit with a processor $\text{PR}_E$ that functions with a processor clock rate $\text{PT}_E$, wherein the following applies: $\text{PT}_n > 2*\text{PT}_E$.

11. The method according to claim 8, wherein the method comprises feeding back a control variable $F^{}An$ to the force/torque controller $\text{REG}_n$, in which the following applies: $F^{}An=F^*An+FG$, wherein FG is a constant trim force for gravitational compensation for gravitational forces acting on the aerodynamic control surface and/or the drivetrain of the respective actuator $A_n$ or wherein FG is an auto-trim function, which is dependent on the $\text{POS}An$ and/or on a time t.

12. The method according to claim 11, wherein the method comprises feeding back a control variable $F^{*}_{An}$ to the force/torque controller $\text{REG}_n$, in which the following applies: $F^{*}_{An}=F^*_{An}+F_D$ or $F^{***}_{An}=F^*_{An}+F_G+F_D$, wherein the following applies: $F_D=d(\text{POS}_{An})/dt*D$, wherein D indicates virtual damping.

13. The method according to claim 12, wherein the method comprises feeding back a control variable $F^{**}_{An}$ to the force/torque controller $\text{REG}_n$, to which the following applies: $F^{**}_{An}=F^*_{An}+F_S$ or $F^{****}_{An}=F^*_{An}+F_G+F_S$ or $F^{****}_{An}=F^*_{An}+F_D+F_S$ or $F^{****}_{An}=F^*_{An}+F_D+F_G+F_S$, wherein the following applies: $F_S=(\text{POS}_{An}-\text{POS}_{ref})*S$, wherein S represents a virtual rigidity and $\text{POS}_{ref}$ indicates a neutral position of the aerodynamic control surface, wherein the neutral position $\text{POS}_{ref}$ is characterized in that no torque inducing movement of the aircraft is generated by the aerodynamic control surface.

* * * * *